May 18, 1926.

J. S. BOOTH

AUTOMOBILE CHASSIS FRAME CONSTRUCTION

Filed August 4, 1924 2 Sheets-Sheet 1

1,584,723

INVENTOR.
James Scripps Booth
BY
Stuart C Barnes
ATTORNEY.

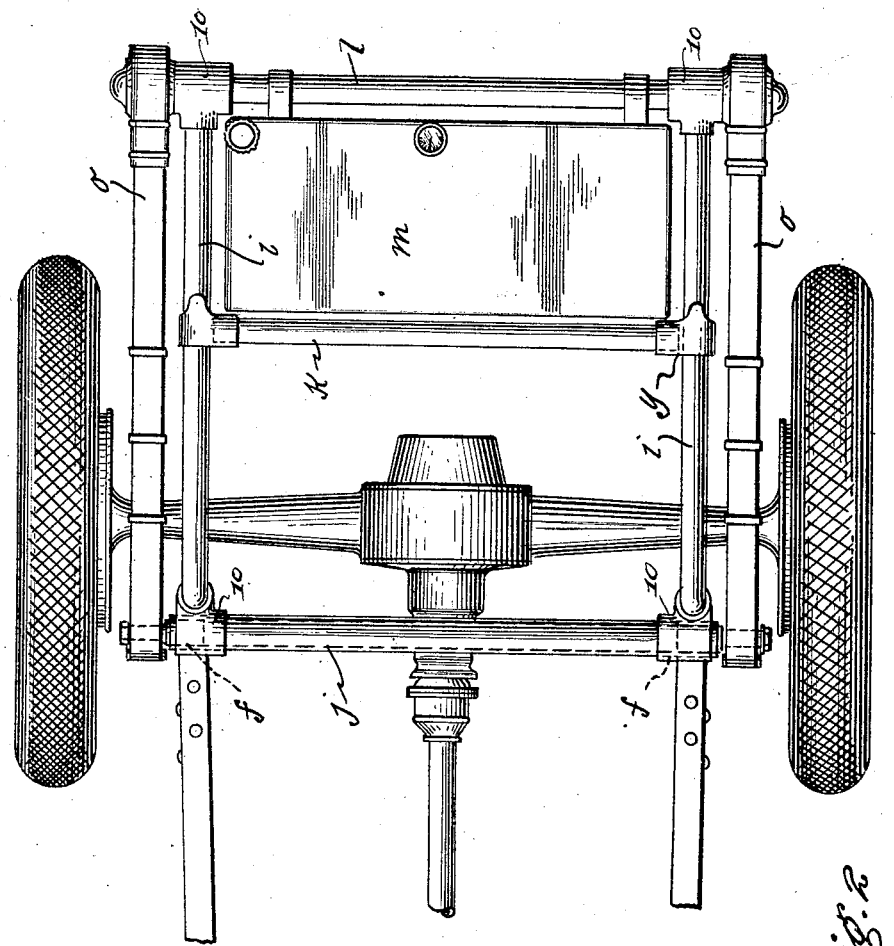
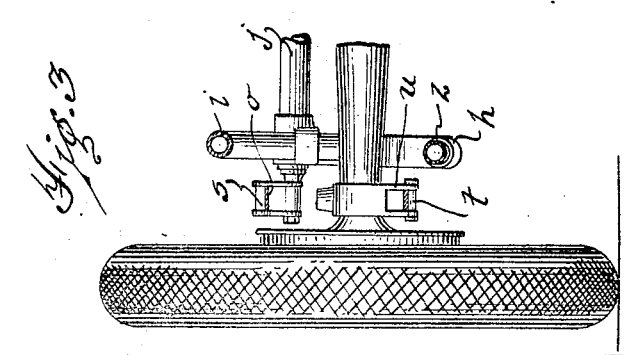

Patented May 18, 1926.

1,584,723

UNITED STATES PATENT OFFICE.

JAMES SCRIPPS BOOTH, OF DETROIT, MICHIGAN.

AUTOMOBILE CHASSIS-FRAME CONSTRUCTION.

Application filed August 4, 1924. Serial No. 729,898.

This invention relates to automobile chassis frame construction. It has for its object an improvement over the ordinary channel frame with the kicked-up portion at the rear to provide clearance for the axle in vibrating up and down as permitted by the flexure at the springs. It is almost universal practice to use a channel frame bar for the sides of the chassis frame. These channel bars are bent or kicked up at the back to give sufficient clearance over the rear axle. However, the channel bar is rather a difficult thing to give a sharp bend. The result is that the curve on the channel has to be begun at a considerable distance from the axle in order to get the necessary clearance over the axle without straining the channel bar.

I overcome this difficulty by using a radically different chassis frame construction, which permits the use of a member which can be bent at a very much sharper angle and thereby does not interfere so much with the disposition of parts inside the car, or other parts of the body. This will be more fully explained hereinafter.

In the drawings:

Fig. 2 is a plan view of the same.

Fig. 3 is a section on the line 3—3 of Fig. 1.

Figure 1:
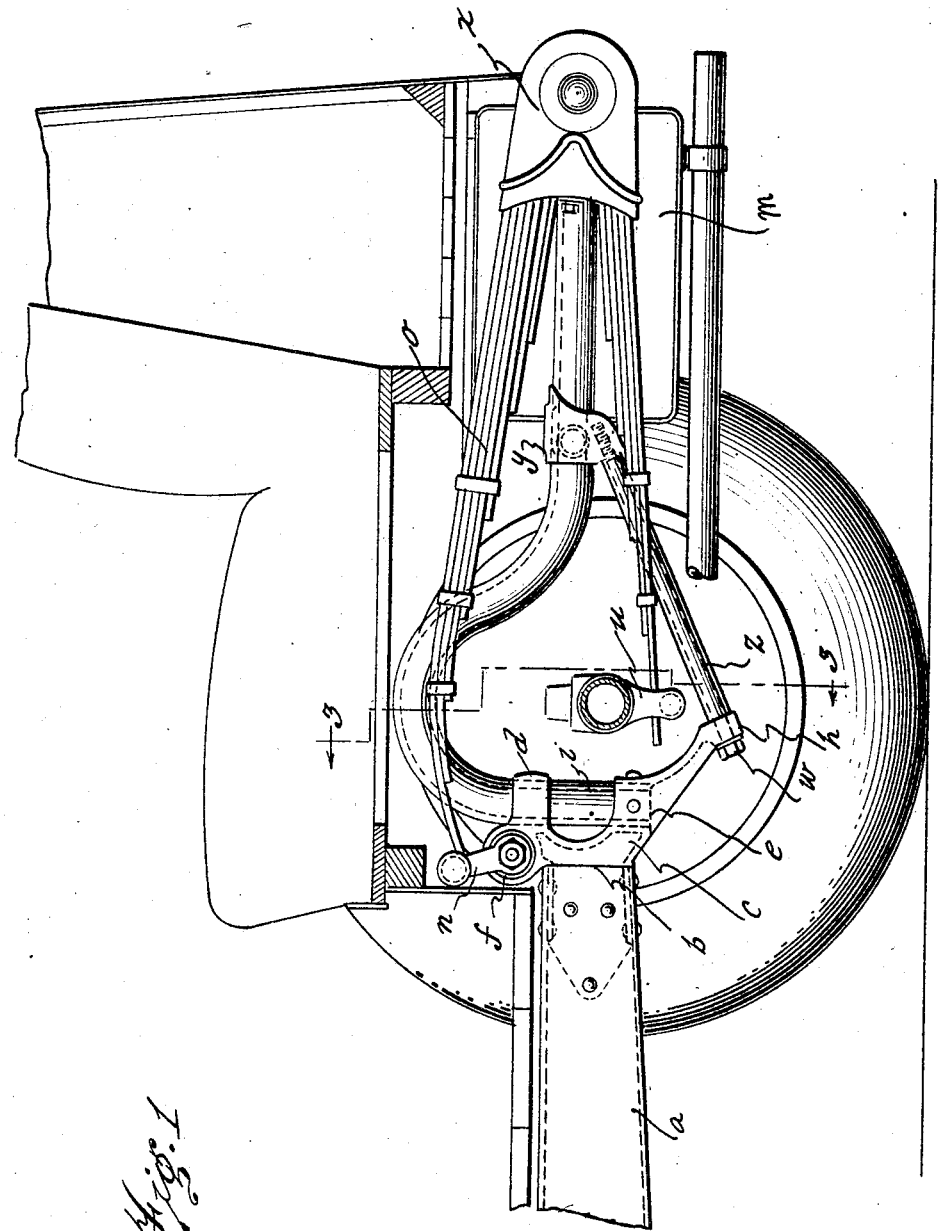
Fig. 1 is a view of the rear of an automobile embodying my invention, some of the parts being in section.

$a$ designates the usual channel bar used in a chassis frame. However, it ends at $b$ and instead of being kicked up or bent up over the axle in the usual way in order to get the necessary clearance, the bend would have to begin at a point in advance of the line $b$, where the bar leaves off. I rivet to the inside of the chassis bar a special fixture $c$ which comprises a plate portion that is fitted into and riveted to the channel and is provided with a pair of aligned eyes $d$ and $e$. Adjoining the eye $d$ is a spring shackle eye $f$ and depending from the eye $e$ is a bolt eye $h$.

The aligned eyes $d$ and $e$ are arranged to take the tubular extension of the chassis bar designated $i$. This tubular extension is very much narrower than the channel bar but is substantially the strength in accordance with the well-known principle that a tube is stronger at a given section than a channel bar. As is well known a tube may be bent at quite a sharp angle or on quite a short radius. It is therefore possible to bend this tube on a radius which is only about half the distance between the tube above the axle and the center of the axle. This permits the tube to come down sharply, as shown in the drawings only a little in advance of the axle. This saves a great deal of room as compared with the old construction where the channel bar has to be bent on a radius as great or greater than the distance of the bar above the center of the axle, and furthermore the base of the curve has to be extended forwardly to emerge into the chassis bar gradually instead of on a sharp curve. This, therefore makes the kicked-up portion of the chassis bar begin at a point very much in advance of where it begins in my construction, and hence if any seats or tool boxes are located near the kicked-up portion it presents quite a problem in requiring the seats to be advanced forward or else the tool boxes under the seats be more or less limited in capacity by reason of the kicked-up chassis frame.

Now referring to the plan view in Fig. 2, it will be seen that this tubular continuation of the side chassis bar is made up into a tubular frame with three cross tubes or struts $j$, $k$, and $l$, that are all secured together by suitable elbows 10, or fixtures that are brazed or welded to the tubes. A gasoline tank $m$ sets in between the two rear struts. The spring shackle eye $f$ is part of one of these fixtures and the shackle $n$ can be supported by a bolt in the end of the cross tube $j$. The hairpin spring $o$ has its forward ends, one looped in an eye around the shackle pin $s$ and the other passing freely over the roll $t$ supported by the bracket arms $u$ from the axle. The rear end or head of the hairpin spring is supported to rock on the projected ends of the cross strut 1, as plainly shown in the drawings. For preventing it from sliding off there are suitable retaining devices contained within the shield $x$, which it is not necessary here to detail or describe.

Preferably in order to further strengthen and braze the parts, I braze or weld a fixture $y$ to the mid-portion of the side tube. A tube $z$ connects between this fixture $y$ and the eye $h$ of the special fixture I have already described, and a bolt $w$ running through this tube serves to clamp the special fixture to about the center of the tube, but underneath the axle. This is a trussing arrangement which makes the structure extremely strong and this truss is removable to permit the axle to be withdrawn.

What I claim is:

1. A chassis frame, comprising chassis bars having a section that is relatively difficult to bend at sharp angles and which extends back to the axle zone, and a kicked-up chassis frame portion rigidly secured to said bars and comprising side bars formed of a metal section capable of being easily bent without wrinkling or mutilating said section at relatively sharp angles.

2. A chassis frame, comprising frame bars of channel section extending back to the axle zone, and a kicked-up portion comprising tubular side bars which are rigidly secured to the ends of the channel bars.

3. A chassis frame, comprising a forward portion having channel side bars, and a rear kicked-up portion having tubular side bars of smaller section rigidly secured to the ends of the channel bars.

4. A chassis frame, comprising a forward section having channel side bars and a kicked-up portion having tubular side bars bent at relatively sharp angles and having the riser portions adjoining the channel bars only shortly in advance of the axle.

5. A chassis frame, having in combination a forward portion constructed of side bars of one section, and special fixtures at the rear end of said bars adjacent the axle zone, and a rear kicked-up chassis portion having side bars of a different cross section which can be easily bent without wrinkling or mutilating said section on relatively sharp angles and which are secured in said fixtures.

6. A chassis frame, comprising a forward portion formed of chassis side bars of a given cross section extending backwardly to the axle zone, a rear kicked-up chassis portion having side bars of a smaller section which may be more readily bent at sharper angles, and truss bars connecting together the parts of the side bars but under the axle.

7. A chassis frame, comprising a forward section employing side channel bars, fixtures riveted to the ends of the side channel bars and including a pair of aligned eyes, and a rear kicked-up chassis portion employing tubular bars fastened in said aligned eyes.

8. A chassis frame, comprising a forward portion employing side bars of channel section, special fixtures secured to the ends of the channel bars adjacent the axle zone, comprising each two aligned eyes with a depending eye, a rear chassis portion which is kicked-up and has tubular side bars bent on relatively sharp angles and secured in the aligned eyes, and truss bars connecting the depending eyes of the special fixtures with the mid portions of the tubular side bars.

9. A chassis frame, comprising a forward section having straight channel side bars in line with the axle and extended backwardly to the axle zone and only shortly in advance of the axle, a special fixture secured to the rear end of each channel side bar, a rear kicked-up chassis portion having side bars of a different cross section which can be easily bent without wrinkling or mutilating said section at sharper angles than would be permissible with a channel side bar section such as used in the forward section of the chassis frame, the kicked-up side bars of said rear chassis portion rigidly secured to said special fixtures, and additional means for supporting the rear chassis portion at a point remote from said fixture.

In testimony whereof I have affixed my signature.

JAMES SCRIPPS BOOTH.